UNITED STATES PATENT OFFICE.

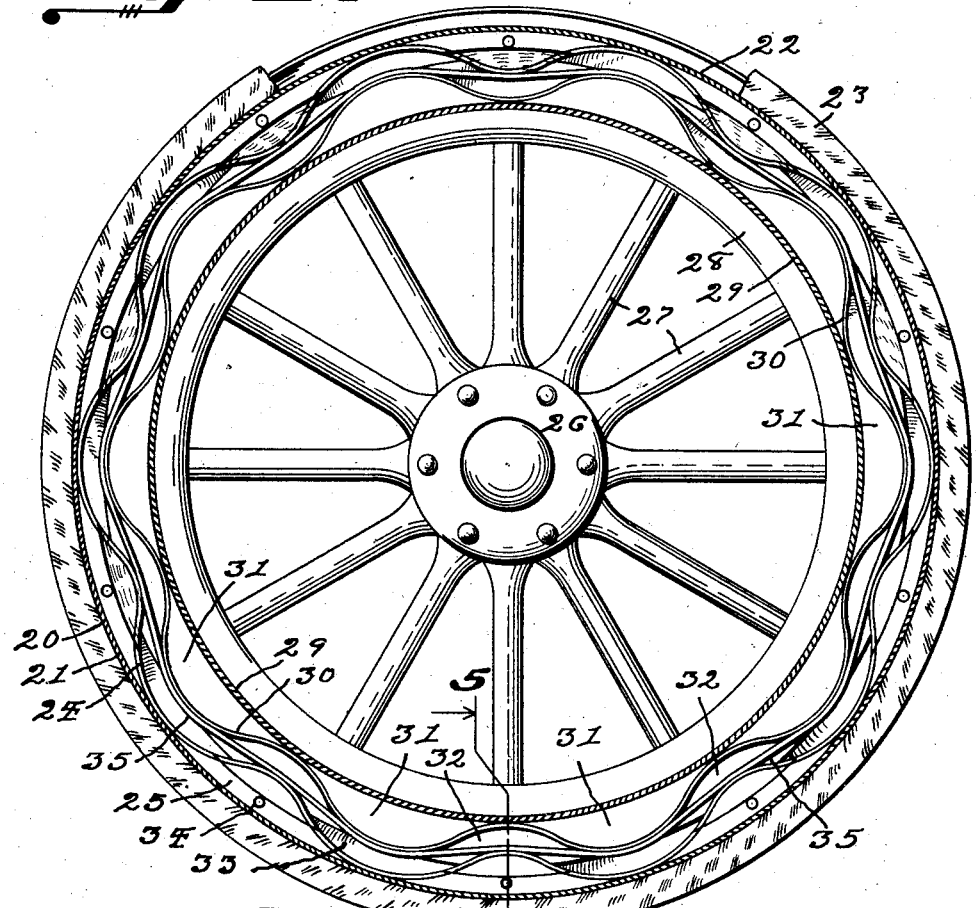
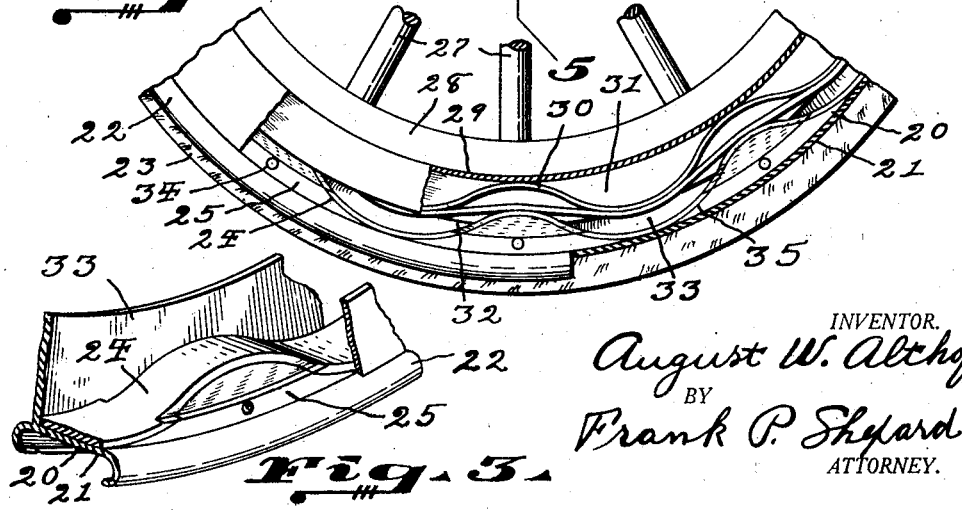

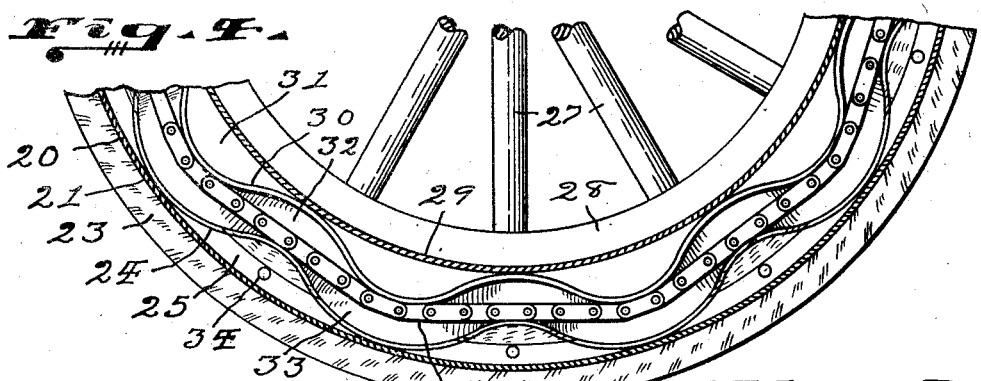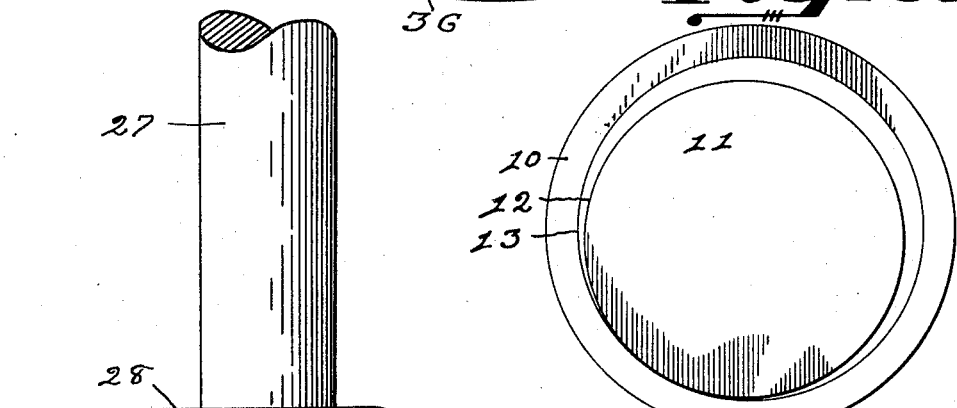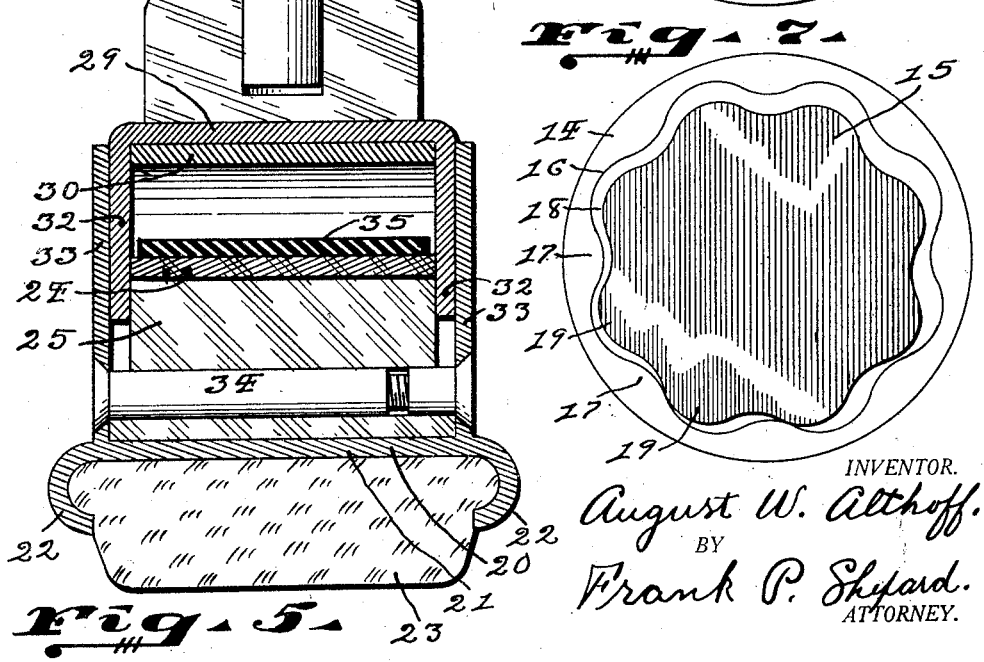

AUGUST W. ALTHOFF, OF OKLAHOMA, OKLAHOMA.

VEHICLE-WHEEL.

1,389,285.  Specification of Letters Patent.  Patented Aug. 30, 1921.

Application filed March 29, 1920. Serial No. 369,773.

*To all whom it may concern:*

Be it known that I, AUGUST W. ALTHOFF, a citizen of the United States, and a resident of Oklahoma city, in the county of Oklahoma and State of Oklahoma, have invented certain Improvements in Vehicle-Wheels, of which the following is a specification, reference being had to the accompanying drawings.

The invention pertains to vehicle wheels of the floating-hub class, an object being to produce a wheel which will absorb shock directed against the hub portion.

Other objects and advantages of the invention will be set forth in the ensuing description.

Figure 1 of the accompanying drawings is a side elevation of the improved wheel, with the outer portion in section.

Fig. 2 is a reproduction of the lower portion of Fig. 1, but with more of the parts in elevation.

Fig. 3 is a perspective view of some of the parts which appear in Fig. 2.

Fig. 4 is a reproduction of a portion of Fig. 1, but with a chain substituted for a flexible tape member.

Fig. 5 is an enlarged sectional view taken on the line 5—5 of Fig. 1.

Figs. 6 and 7 are diagrams for purposes of description.

Like characters of reference designate like parts in all the figures.

In Fig. 6 there is shown an outer rim 10, and within this rim is a circular disk 11; these parts being spaced a small distance, say five-eighths of an inch in a thirty-inch wheel.

If the outer rim 10 is rolled on a road surface, the inner disk 11 will roll with its outer periphery 12 in rolling contact with the inner periphery 13 of said rim, and in the course of a few revolutions of the whole structure will complete one or more revolutions within and with respect to said rim; there being nothing to force any sliding movement between the two parts.

In Fig. 7 there is shown an outer rim 14, and within this rim is a disk 15, also spaced from the outer rim.

But the inner periphery 16 of the outer rim 14 is corrugated as at 17, and the outer periphery 18 of the disk 15 is also corrugated as at 19; the corrugations of the rim and disk being equal in number and interprojecting each other just enough so that the disk cannot, in concentric or eccentric position, make more than a small fraction of a revolution in the rim.

With the two parts arranged in this way, they are related to each other as external and internal gears with equal numbers of teeth, but with the pitch-line spacing of the inner gear shorter than that of the outer.

It will be seen that as the disk 15 rolls on the outer rim 14 it must continually slide on the outer rim to bring its corrugations into "mesh" with those 17 of said rim; and in the present invention this sliding movement of the corrugations is utilized for shock-absorbing purposes.

Referring now to Figs. 1 to 5, the outer rim portion 20 of the practical wheel may include an outer annular band 21 which has its edges flanged as at 22 to retain a suitable tread member 23.

The corrugations of the outer portion may be formed by corrugating a strap-metal band 24 and securing the same to the inner surface of the band 21; fillings of wood 25 being interposed between the bands 21 and 24 to support the crests of the corrugations.

The inner or floating portion of the wheel may include the usual hub 26, spokes 27, wooden rim 28, and a metal band 29 which acts as a tire for the rim 28.

The corrugations of the inner portion of the wheel may likewise be formed by corrugating a strap-metal band 30 and securing said band to the band 29, fillings of solid wood 31 being interposed between the bands 29 and 30 to support the crests of the corrugations.

To prevent lateral displacement of the two portions of the wheel, the band 29 of the inner one may be provided at its edges with flanges 32 between which the corrugations of the outer portion movably project.

The outer band 21 of the outer portion may also be provided with flanges 33 which collectively straddle the flanges 32 of the inner portion to exclude dirt; and bolts 34 may pass through the flanges 33 and wood fillings 25 at intervals to reinforce the strength of the outer portion.

In further arrangement, I interpose between the outer and inner portions of the wheel an endless tension member 35 of flexible material.

This endless member 35 need have no resistance to flexure, but it should have all possible tensile strength and elasticity, and with the outer and inner portions of the wheel in the concentric position shown in Fig. 1 said member should be taut, In order, then, for the inner or hub portion of the wheel to move to an eccentric position, the endless member 35 must yield lengthwise against its elasticity; more of the endless member being taken up by the intermeshing of the corrugations on the side of the wheel toward which the movement occurs than on the opposite side.

Between each of the corrugations of the outer portion on the lower side of the wheel, or on the side toward which the inner portion moves, the member 35 acts as a yieldable hammock suspension for the corrugations of the inner portion when said inner portion is sliding downward and forward in adjusting its mesh with the other portion.

Instead of the flexible tape member 35, an endless chain 36 or other tension member composed of sections pivotally or otherwise movably connected together may be employed.

The chain 36 should, however, have the elasticity of tension for the same purposes as the endless member 35.

The following is claimed:—

1. In a vehicle wheel, an outer rim portion, and an inner floating portion within and spaced from said rim portion, the inner periphery of the outer portion and the outer periphery of the inner portion being corrugated, and an endless flexible tensioning member interposed between the two portions.

2. In a vehicle wheel, an outer rim portion, and an inner floating portion within and spaced from said rim portion, the inner periphery of the outer portion and the outer periphery of the inner portion being corrugated with the corrugations of one portion interprojecting those of the other far enough to limit relative revolving movement of the two portions, and an endless flexible tensioning member interposed between the two portions, the flexible member being short enough to be taut when the two portions are in concentric position.

3. In a vehicle wheel, inner and outer bands, an outer rim portion, an inner floating portion within and spaced from the rim portion, the adjacent faces of said portions being corrugated, and an endless structural flexible member between the two portions and endwise yieldable independent of the movements of said portions.

Witness my hand this 20 day of March, 1920.

AUGUST W. ALTHOFF.